United States Patent [19]

Gerry

[11] 4,265,201

[45] May 5, 1981

[54] STRATIFIED FUEL IGNITION SYSTEM INCLUDING HUMID AIR INJECTION

[76] Inventor: Martin E. Gerry, 13452 Winthrope St., Santa Ana, Calif. 92705

[21] Appl. No.: 59,465

[22] Filed: Jul. 20, 1979

Related U.S. Application Data

[63] Continuation-in-part of Ser. No. 923,828, Jul. 12, 1978, Pat. No. 4,216,412, and a continuation-in-part of Ser. No. 878,792, Feb. 17, 1978, Pat. No. 4,169,445, and a continuation-in-part of Ser. No. 868,118, Jan. 9, 1978, Pat. No. 4,168,692, and a continuation-in-part of Ser. No. 812,912, Jul. 5, 1977, Pat. No. 4,176,647.

[51] Int. Cl.$^3$ .......................... F02B 23/00; F02P 1/00
[52] U.S. Cl. ................................... 123/260; 123/266; 123/651; 123/654
[58] Field of Search ..... 123/148 AC, 148 E, 148 CB, 123/148 DC, 32 SP, 32 ST, 25 R, 25 A, 169 R, 169 EL; 313/141, 138; 315/209 T, 209 CD

[56] References Cited

U.S. PATENT DOCUMENTS

| | | | |
|---|---|---|---|
| 1,294,894 | 2/1919 | Froom | 123/148 DC |
| 3,140,423 | 7/1964 | Roberts et al. | 315/209 T |
| 3,265,931 | 8/1966 | Gerry | 123/148 AC |
| 3,361,929 | 1/1968 | Vandover | 123/148 E |
| 3,841,287 | 10/1974 | Nielsen | 315/209 T |
| 3,949,718 | 4/1976 | Turner | 123/148 AC |
| 3,961,609 | 6/1976 | Gerry | 123/119 E |
| 4,041,922 | 8/1977 | Abe et al. | 123/148 E |
| 4,122,815 | 10/1978 | Gerry | 123/148 E |
| 4,161,937 | 7/1979 | Gerry | 123/169 EL |
| 4,169,445 | 10/1979 | Gerry | 123/148 AC |

*Primary Examiner*—P. S. Lall

[57] ABSTRACT

An ignition system having first and second modes of operation is part of an engine which develops motive power by burning fuel received in a main combustion chamber. An auxiliary combustion chamber that is integral with the main combustion chamber is provided. These chambers have a common passageway through which the auxiliary chamber receives a portion of the fuel. An electrical igniter is integral with the auxiliary chamber, the igniter having an electrically conductive base and an electrode insulated from such base. An ignition transformer is included that has a primary and secondary winding wherein the secondary winding is coupled to the electrode. A capacitorless excitation circuit is provided that is coupled to the primary winding for generating an electrical arc within the auxiliary chamber during the second mode of operation.

31 Claims, 13 Drawing Figures

STRATIFIED FUEL IGNITION SYSTEM INCLUDING HUMID AIR INJECTION

CROSS REFERENCE TO RELATED PATENT INSTRUMENTS

This application is a continuation in part of copending applications Ser. No. 812,912 filed July 5, 1977, now U.S. Pat. No. 4,176,647; Ser. No. 923,828 filed July 12, 1978, now U.S. Pat. No. 4,216,412; Ser. No. 868,118 filed Jan. 9, 1978, now U.S. Pat. No. 4,168,692; and Ser. No. 878,792 filed Feb. 17, 1978, now U.S. Pat. No. 4,169,445.

U.S. Pat. Nos. 3,265,931 and 4,161,937 are incorporated by reference for details of igniters and magnetization of igniters. U.S. Pat. No. 3,961,609 is incorporated by reference for details of fuel oxidizers.

BACKGROUND OF THE INVENTION

This invention is in the field of modulation ignition systems for developing motive action by virtue of burning fuel mixtures in an engine, and also in engines providing dual strata ignition of such fuel mixtures.

Ignition system employing alternating current modulation of transient generated energy are not known in the prior art.

Dual strata fuel ignition utilizing conventional ignition systems in conjunction with a DC power source is exemplified by U.S. Pat. No. 4,041,922.

A disadvantage of such prior art dual strata ignition system resides in the need for utilizing a separate DC high voltage power source wherein such power source is coupled directly to each igniter or through a distributor to obtain an ionization potential difference and hence a DC field within a fuel ionizing chamber.

When coupled directly to the igniters through a network of diodes and resistors, the igniters may be caused to cross-fire at the wrong time in view of the fact that such network does not isolate one igniter from another.

When coupled through the distributor by connecting the DC high voltage source to the distributor rotor, the DC field resulting is divided between the distributor members and the related igniter which is attempted to be energized, thus materially reducing the electric field intensity within the ionization chamber and minimizing the effects and purpose of establishing such electric field in the first place.

Such prior art is also confused as between an electric field as provided by an active power source and an electrostatic field bearing no relationship to an electric field, and not being possible of use in any system to which any sort of wire is connected. However, it will be assumed that the prior art means to state an electric field rather than an electrostatic field as otherwise such prior art system would be inoperative.

Additionally, such prior art system suffers from the lack of appreciation of the physics involving electromagnetic fields, how such fields can operate so as to condition fuel molecules, and the basic principles as to how an uncharged fuel particle becomes charged in terms of elementary atomic structure alteration. Such lack of appreciation invariably leads to the wrong conclusions, resulting in a system which is at best far removed from the objective which the prior art attempts to achieve.

One such lack of appreciation is shown by the fact that such prior art only recognizes a requirement for a so called negative DC power source to establish a so called static field in an ionization chamber bearing the electrical igniter.

Such prior art is imbued with the belief that in order to ionize a particle, it is necessary to add to it an electric charge from the static field and to use a pointed electrode connected to the high voltage DC source. Both beliefs are incorrect. Firstly, ionization or charging of a particle of matter is obtained rather simply by removing an electron from the outer shell or ring of one of the atomic elements constituting the fuel molecule, not by adding electrons which such prior art seems to believe is the case when such particles are subjected to an electric field. It is far easier to free an electron from the outermost ring surrounding an atom thus leaving the particle in which the atom resides deficient in electrons and consequently positively charged or ionized, rather than attempt the converse. Secondly, it is neither necessary nor even desirable to use a static or DC field for such purpose.

If it is desirable to achieve ionization as well as turbulence of the mixture of fuel, as indicated by the prior art, a varying or temporal electric field would be far more advantageous.

However, even when a DC field sets up a charge upon a particle of matter, when the charged particle is moved, a current is created which in turn creates a magnetic field. This latter concept not being appreciated by the prior art, any system design based on the prior art inherently provides inferior performance in relation to the sought after objective of charge movement and acceleration.

SUMMARY OF THE INVENTION

In context of the prior art deficiencies, it should be noted at the outset that in a system utilizing fields for ionization of fuel particles, Maxwell's well known equations have established that electric fields give rise to magnetic fields and conversely magnetic fields give rise to electric fields.

Detailed treatment involving Maxwell's equations is both beyond the scope of this specification and not required, except that such phenomena should not be ignored.

However, in conjunction with electromagnetic field phenomena, the forces such fields exert upon matter is of extreme importance as related to the objective of ionization and acceleration of fuel particles.

Lorentz developed his equation for a force exerted upon an electric charge moving with a velocity, which takes into account the Maxwell relationships. Such electric force may be stated as:

$$F = q[E + v \times B] \quad (1)$$

where F is the vector force due to an electric field, q is the coulomb charge which is a scalar quantity, E is the vector electric field intensity, v is the vector velocity of such charge and B is the vector magnetic flux density produced due to such charge movement in an electric field.

It can be seen from (1) that such electric force on a moving charge carries with it a magnetic field component B. Each of these terms being a vector, except q, each will have three components, and the vector cross product $v \times B$ results in substantially more than three components. Since these several field components have different directions, it can be seen how ridiculous it would be for one to assume a single direction of charge migration within an electrified chamber, as assumed by the prior art.

Further, following the Lorentz equation principles, Professors Fono, Chu and Adler of the Massachusetts Institute of Technology, in their textbook entitled Electromagnetic Fields, Energy and Forces, at pages 270-274, published by John Wiley and Sons, New York, copyright 1960, developed the analogous equation for a vector force due to a magnetic field. Such magnetic vector force may be stated as:

$$F^* = q^*[H - v \times D] \qquad (2)$$

where $F^*$ is the vector magnetic force, $q^*$ is the scalar magnetic charge quantity equivalent of the electric charge, $H$ is the magnetic field intensity, $v$ is the vector velocity of the magnetic charge, and $D$ is the vector electric displacement which is equal to the relative permitivity of the charged particle multiplied by the electric field intensity vector $E$.

Further, it can be seen from the relationship of:

$$F = m a \qquad (3)$$

that a force is proportional to the mass it acts upon multiplied by the acceleration of such mass, that the acceleration of a charged fuel particle can be determined from equations (1) and (2) when the particle mass is known and the field quantities are known.

It is therefore obvious from (1), (2) and (3) that ionization by stripping of electrons from fuel molecules and accelerating them by subjecting the fuel molecules to electric and magnetic fields which are dynamic can be affected more readily than using DC fields. It is also obvious from such equations that creating turbulence of fuel in a chamber can also be more readily obtained by use of dynamic fields rather than stationary fields.

Accordingly, it is an objective of this invention to utilize electromagnetic fields for charging and moving such fuel particles inter-strata, as well as igniting such particles in motion.

Another objective of this invention is to utilize an alternating current modulation system so as to modulate a generated transient current and thereby provide high energy ignition levels.

A further objective of this invention is to provide an ignition system where the transient energy is created by precharging and discharging an inductor and a capacitor so that energy from the capacitor on discharge aids the inductor discharge current.

A still further objective of this invention is to utilize modified igniters which provide very long ignition arcs extending between their axial electrodes and bases. This objective is furthered by enabling the establishing of a constant ignition firing angle irrespective of engine speed or load change.

Still a further objective of this invention is to provide an ignition system which in addition to the normal ignition power sources, also is capable of providing a plurality of independently isolated high voltage channels for furnishing each igniter a substantially independent and isolated voltage source so that each igniter can perform the function of ionization of fuel in its independent ionization chamber, resulting in reliable ignition arc generation for any igniter without affecting any other of the igniters in the engine.

Yet a further objective of this invention is to provide an alternating current modulated transient with a waveform of extremely high bipolar voltage excursions of short time duration and a bipolar waveform of lower voltage excursions having long time duration extending over the entire time span allocated for igniter firing. Such high amplitude short duration voltage providing the requisite power to instantly ionize the fuel mixture and initiate the igniter's electrical arc, whereas the lower amplitude long duration waveform portion sustains the electric field set up in the ionization chamber by the high amplitude short duration voltage, and also sustains the generated arc over the entire firing period therefore also maintaining a magnetic field contributed by the arc over the entire firing period of the igniter. Such fields therefore will not only ionize the fuel in the ionization chamber, but maintain such arc at high velocity as well as cause very rapid acceleration of ignited ionized fuel from the ionization chamber into the fuel mixture within the main fuel chamber so as to completely oxidize the fuel therein to provide efficient motive energy for the engine.

Accordingly, an engine for developing motive power by virtue of burning a fuel mixture, utilizes primary means for receiving the fuel mixture. Secondary means, integral with the primary means, is provided which has a passageway to the primary means thereby enabling injection of part of the fuel mixture into the secondary means. Igniter means, integral with the secondary means, establishes an electric and magnetic field and an electrical arc within the secondary means. Ignition means, coupled to the igniter means, enables the igniter means to provide the electric and magnetic fields and the electrical arc within the secondary means so as to ionize and ignite that part of the fuel mixture which is in the secondary means and accelerate ignited particles of the mixture through the passageway into the fuel mixture within the primary means for igniting same.

Driving means which couples the engine and the ignition and timing means, enables the ignition means to provide a substantially constant ignition timing angle for any rotational speed of and loading imposed on the engine.

The ignition means has first and second modes of operation and includes an ignition transformer with a primary and secondary winding. The igniters are coupled to the secondary winding. Such ignition means also includes timing means that is coupled to the primary winding for enabling the primary winding to be charged during the first mode and discharged so as to provide a discharge current during the second mode. Modulation means is coupled to the primary winding and is activated by the timing means during the second mode for modulating the discharge current. The igniter means thereby establishes an electric field and an electrical arc within the secondary means wherein the arc provides the magnetic field. Additionally, a capacitor may be connected in parallel with the primary winding so as to form a parallel circuit therewith. Such capacitor as well as the primary winding being charged during the first mode and discharged during the second mode in a manner so as to cause the capacitor discharge current to aid the discharge current of the primary winding and thus increase the energy being fed to the igniters.

The secondary means may be formed of a hollow tubular adaptor which is open on one end for insertion of the igniter and has an aperture on the other end that is threaded into the engine which serves as the passageway. Thus the igniter in the secondary means will produce the electric field and arc between the igniter's axial electrode and base when the igniter is energized by the ignition means. Such igniter may also have an additional member attached to the end of the axial electrode and spaced from the base, so that such igniter when inserted directly into the engine will cause a separate chamber to be formed between the base, the member and the walls of the fuel retaining chamber. Such separate chamber will act as the secondary means or ionization chamber, and the spacing between the member and the walls will constitute the passageway. Such latter igniter being magnetized will also provide an additional magnetic field supplementing the magnetic field provided by the electrical arc to aid in the ionization and acceleration process of ignited fuel particles so as to strike the fuel mass in the main fuel chamber or primary means.

The ignition system or ignition means can also contribute to the ionization process by virtue of the modulation circuit thereof having a plurality of electrical output windings to enable each igniter to be independently connected to its own power source which can furnish either AC or DC potentials.

The timing means includes a timer driven by the engine, and an electronic logic circuit coupled to the timer.

The engine has at least one electrical igniter coupled to the ignition system, such igniter having an electrically conductive tubular base and an electrode insulated from the base. The ignition system develops an electrical arc during the second mode which spans the entire distance between the electrode and base.

Driving means, couples the engine with the ignition system, and enables ignition timing to be provided by the timing means during the compression cycle of the engine at an angle sufficient to sustain the electrical arc.

The ignition system has sufficient power so that coupled with the use of igniters that provide long arcs, the timing location of the engine is sufficiently advanced and locked into place so that the system operates the engine at a constant timing angle for any rotational engine speed and any loading imposed on the engine.

With respect to the dual ignition strata characteristic of the engine, the engine has a main chamber for receiving the fuel mixture and an ionization chamber adapted to the main chamber. An electrical igniter is adapted to the ionization chamber and such igniter is coupled to the secondary winding of the ignition transformer. Additionally, electrical power means which is an integral part of the modulation means, is connected to each igniter, so that each igniter has its own isolated power source to provide a high AC or DC voltage, in addition to the ignition power, to its axial electrode. Such additional high voltage power source also creates an electric field between the igniter's base and electrode to aid in the ionization process of the fuel portion in the ionization chamber. Since this power source provides independent power supplies to each igniter, each igniter operates independently of the other igniters in receiving ionization potentials, assuring reliable igniter firing without interference with other igniters.

An additional conductive electrode attached to the axial electrode and orthogonal thereto results in a different igniter which can be used by inserting same directly in the engine. Such igniter and its orthogonal electrode forms a natural chamber with the walls of the main chamber between the additional electrode and the base of the igniter and the walls of the main chamber. Hence, such natural chamber can be used as the ionization chamber. Additionally, such igniter may also be magnetized, so that an additional magnetic field would be present to aid in the ionization process and acceleration of the ionized and ignited fuel particles in the natural chamber through openings between the additional conductive electrode and walls of the main chamber to ignite the fuel mixture within the main chamber.

Thus several electric fields may be created in the ionization chamber as well as several magnetic fields by virtue of the main power source creating an electric field and electrical arc which supplies a magnetic field and by virtue of the additional power source provided by the modulation means which establishes an electric field across the igniter base as well as the magnetized igniter which also provides a magnetic field in the ionization chamber.

A humidifier containing water absorbing material and saturated with water, and optionally having a water supply source, is coupled to the vaporizing means such as a carburetor. This humidifier substitutes for the conventional air filter unit within the air cleaner. When air is forced through the water absorbing material into the vaporizing means it is saturated with water so that humid clean air is mixed with the fuel in its gaseous state in the combustion chamber. This unit effectively employs the principle of water injection without adding additional equipment to the engine. For a fuel injection engine system, a similar unit is used but the mixing of humid filtered air occurs simultaneously with injection of vaporized fuel by a nozzle feeding each engine combustion chamber.

DETAILED DESCRIPTION

Figures 1, 2:
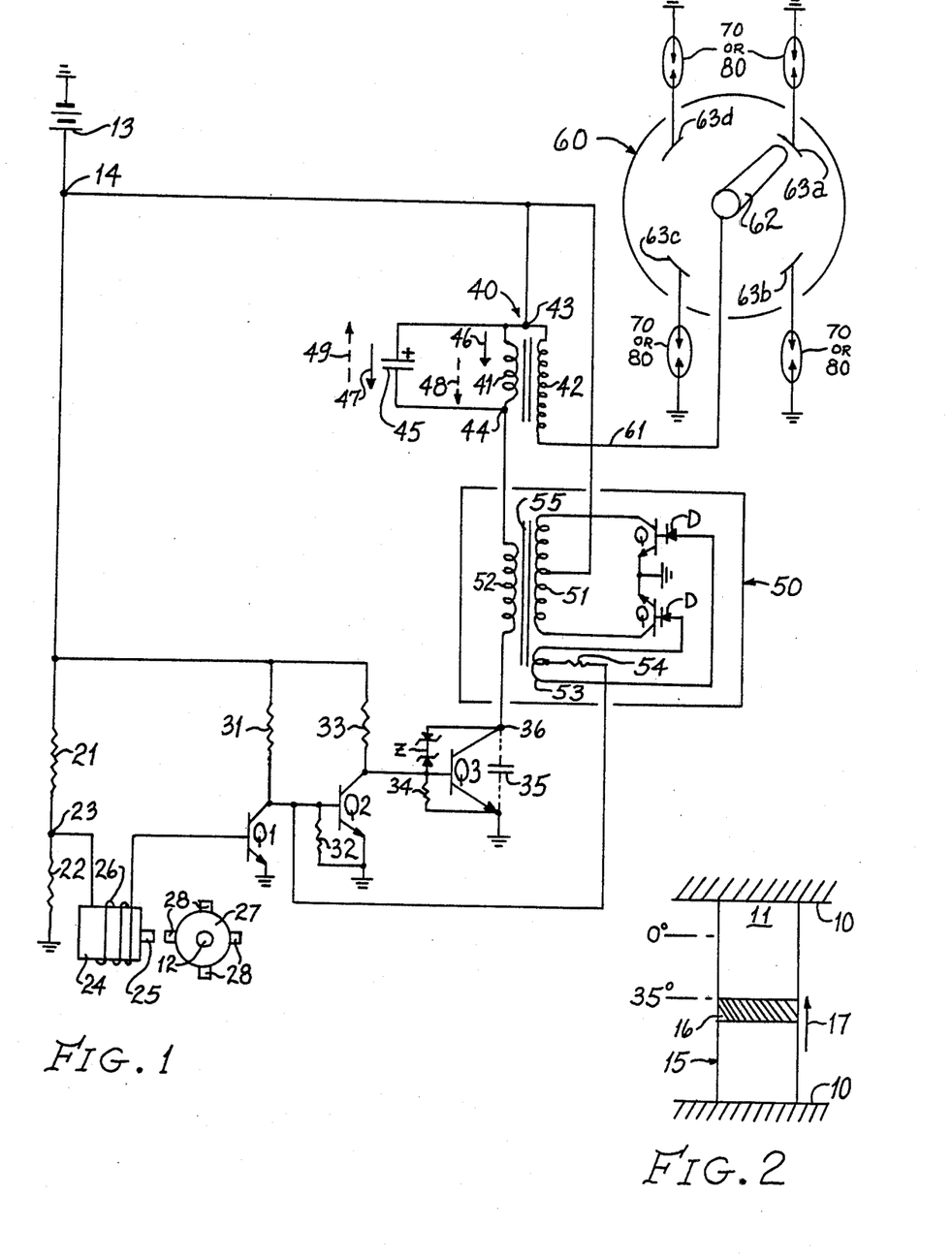
FIG. 1 is an electrical schematic of the ignition system in accordance with the invention.
FIG. 2 is a schematic representation of an engine cylinder and a piston therein to enable discussion of specific ignition timing.

Referring to FIG. 1, the ignition system illustrated is for a four cylinder, four igniter engine employing a magnetic pulse type timer driven by the engine by means of shaft 12 and using a distributor of electrical energy having a rotor member which is also driven by shaft 12.

The schematics of this specification utilize the conventional ground symbol which is unnumbered. Such ground symbol is representative of the negative terminal of battery 13 as well as both DC and AC return paths.

Junction 14 is connected to the positive terminal of battery 13 to enable energizing primary winding 41 of ignition transformer 40 with DC power at junction 43 of the transformer during the first or charging mode of the system, to provide DC power to rectangular wave generator 50 at the center tap of winding 31 of its output transformer and to supply DC power to the timer and to the logic circuit to which it is coupled.

Details of the manner in which generator 50 functions need not be supplied inasmuch as such may be found in U.S. Pat. No. 3,841,287 and even to a better extent described in technical bulletin TC-101B entitled Tape Wound Cores, published by Arnold Engineering Company of Marengo, Illinois, at pages 45-46, copyright 1972, wherein it is referred to as a Royer type oscillator. However, output winding 52 thereof needs some discussion of the generator's interconnection in this system, and winding 53 is used to supply feedback signals as well as constitute the means by which bias power is intermittently supplied to transistors Q so as to duty cycle the generator. It may be noted that diodes D in series with the bases of transistors Q inhibit negative base voltages and currents from appearing at the bases which if excessive would destroy these transistors.

The timing means utilizes a voltage divider consisting of resistors 21 and 22 having a common junction at 23, resistor 21 being fed +DC power from junction 14. Junction 23 provides in the order of +1.2 volts DC input to one end of winding 26 of a permanent magnet sensor which has permanently magnetized core 24 and a magnetic pole piece 25. The timer includes a reluctor wheel 27 made of magnetic material which has magnetic material protrusions 28 integral therewith and regularly spaced about its periphery. For the four cylinder, four igniter engine each of protrusions 28 effect an ignition period for a respective one of the igniters. During operation of the engine, shaft 12 driven at half the engine's rotational speed, will cause reluctor wheel 27 to be driven so that periodically protrusions 28 will pass pole piece 25, at which time a voltage is induced in winding 26. The voltage induced is of the form having negative and positive polarities each time protrusion 28 passes pole piece 25. Such characteristics are well known in the art since the basic magnetic timer is not novel and need not be discussed. The timing means herein will only utilize its negative polarity for timing control, as discussed hereinbelow.

The other end of winding 26 is connected to the base of an NPN type transistor Q1 the emitter of which is grounded and the collector is connected through resistor 31 to junction 14. The collector of Q1 is connected to the base of transistor Q2 which is also an NPN type transistor having its emitter grounded and its collector connected via resistor 33 to junction 14. Resistor 32, connected between the base and emitter of Q2, forms a voltage divider network with resistor 31, so that the maximum allowable base voltage provided by DC source 13 to the base of Q2 is not exceeded. The collector of Q2 is connected to the base of high current and high voltage NPN type transistor Q3 and its emitter is grounded whereas its collector is connected to one end of output winding 52 of generator 50 at junction 36. Inasmuch as high voltages will be developed between the collector and emitter and between the collector and base of both negative and positive polarities during the non-conductive phase of Q3, a zener diode assembly Z is connected between its collector and base and a low ohmic resistor 34 is connected between its base and emitter. This combination of Z and 34 is utilized to regulate and clamp the voltage levels between the collector and base and base and emitter so as not to exceed the rated values for Q3. In fact, it is desireable to establish regulation to lower than rated levels by at least 25% to enable Q3 to operate efficiently, cool and reliably.

In this particular circuit, zener assembly Z has a bipolarity rating of 400 volts, which means that any voltage in excess thereof will be cut off and not applied between the collector and base nor between base and emitter of Q3. It can be readily seen how assembly Z regulates the voltage between the collector and base, since it is connected thereacross. However, since resistor 34 is in the order of 25 to 50 ohms, the zener assembly Z in series with resistor 34 will be effectively connected between collector and emitter and the low ohmic value of resistor 34 will still provide a low impedance between collector and emitter so that most of the voltage drops due to the energies generated by the system, will occur across windings 41 and 52 due to their substantially higher impedances than the collector to emitter impedance of Q3.

The collector of Q3 is coupled at 36 to output winding 52 of generator 50, the other side of winding 52 being connected to terminal 44 of primary winding 41. Primary 41 has capacitor 45 connected thereacross and the use of such capacitor enables the capacitor to be charged by battery 13 during the first mode of the system at the same time primary winding 41 is charged, and discharged during the second mode of the system when a discharge current flows through winding 41.

It has been found by experimentation, that capacitor 45 is not required, or for that matter, no capacitor is required in this sytem in order to obtain ignition power. Capacitor 35 was also connected between junction 36 and the emitter of Q3 and the use of such capacitor reduced the operation performance of the system as compared with the non-use of capacitor 35. However, the performance of the system with capacitor 45 only was better than the condition where no capacitor was used. A performance characteristic table is shown below.

Secondary winding 42 of transformer 40 is connected by means of high voltage cable 61 to rotor 62 of high voltage distributor 60. Distributor 60 is a four port device used to connect the four igniters 70 or 80 to the stationary members 63a through 63d of the distributor.

In order to activate generator 50 during the second mode of operation so that it provides its rectangular wave output by means of winding 52, which output is used to modulate the discharge current from either primary 41 alone when no capacitor 45 is used, or modulate the discharge current flowing in both winding 41 and capacitor 45 when capacitor 45 is used, it is necessary to turn on generator 50 at the beginning of the second mode. This is accomplished by means of the connection made from the collector of Q1 to resistor 54 which in turn is connected to the center tap of winding 53. Resistor 54 is actually a very low ohmic resistor such as one-ohm, used to determine the base current in transistors Q by measuring the voltage drop across such resistor 54. The actual DC biasing current will not be excessive if the values of voltage divider 31-32 is established so that the voltage across resistor 32 is not in excess of the base voltage rating for that type of transistor. It should be noted that the energy stored in the output transformer of generator 50 is also a function of the magnetic material of core 55. It has been found that cold rolled steel or relay steel is very effective for use as a core for the low frequencies of oscillation of generator 50.

It should also be noted that from here on, it will be assumed that capacitor 35 will not be in the circuit of FIG. 1, shown by dotted line connectors as indicative of it being in circuit only long enough to determine its effectiveness. It may be noted that transistors Q, Q1 and Q2 as used were of the 2N3055H type which are very reliable transistors, and that transistor Q3 could be selected from the group of 2N6547, Motorola's MJ 10009 or 10012, or Delco's DTS 4067.

Operationally, during the first mode, as reluctance wheel 27 is driven and none of protrusions 28 are opposite pole piece 25, no negative pulse is induced in winding 26, and since the base of Q1 is at a small positive potential, Q1 conducts thereby lowering its collector to zero or ground potential and setting the base of Q2 at zero potential. The bias applied to resistor 54 will be zero and no base current will flow in transistors Q thereby maintaining generator 50 quiescent and not providing any output to winding 52. Since Q2 base is at zero potential, Q2 will not conduct and its collector will be at positive DC potential so that the base of Q3 is positive and causing base current to flow in Q3 and hence to cause collector current to flow in Q3, so that Q3 will conduct and thereby lower its collector to zero or ground potential. Thus there will be provided a ground potential at junction 36 so as to enable current to flow from battery 13 to charge primary winding 41 and also to charge output winding 52 during such first mode. In the case where capacitor 45 is used, such capacitor will also be charged during the first mode.

During such first mode, a charging current will flow through winding 41 in a direction as denoted by arrow 46 and such current will also flow through winding 52. When capacitor 45 is used, a charging current will flow as denoted by arrow 47 to polarize the plates of the capacitor as shown in the drawing and such charging current will also flow through winding 52.

When reluctor wheel 27 is driven so as to cause protrusion 28 to begin to align with pole piece 25, a negative-going pulse will be induced in winding 26 causing the base of Q1 to be negatively biased since such negative-going pulse will overcome the positive bias level of the base, thereby stopping the flow of base current in Q1 and causing collector current in Q1 to stop flowing, which raises the collector potential to a positive value causing base current to flow in Q2 and causing Q2 to conduct. This causes collector current to flow in Q2 lowering its collector potential to zero and providing zero bias to the base of Q3 which causes collector current to stop flowing in Q3 and Q3 to stop conducting as well as to stop enabling the charging action above described. The stopping of conduction of Q3 cuts off the DC feed path from battery 13 to windings 41 and 52 and to capacitor 45. Also at this time, Q1 collector being at a positive potential will provide a positive DC bias to resistor 54 to start generator 50 oscillating, and thereby provide a voltage output therefrom across winding 52. There being no path for discharge current to flow through Q3, in the case where no capacitor 45 is used, the voltage from generator 50 will modulate the voltage induced in winding 41 by virtue of discharge current flow therethrough to provide a high voltage across winding 42 by a factor of about 100, which factor is the turns ratio of transformer 40, so as to activate one of the igniters 70 or 80 with modulated energy, since igniters 70 or 80 are coupled to secondary winding 42 by means rotor 62 and stationary distributor members 63a through 63d.

However, with capacitor 45 in the system, initially, discharge current 49 flowing will be opposite to the direction of flow of the capacitor's charging current 47, since current from a charged capacitor must always flow outwardly from its terminal having a positive potential, whereas in the case of primary 41 its discharge current path 48 is continued in the same direction 48 as its charging current 46, for these are the characteristics of reactive components. Accordingly, discharge current 49 will flow in a direction to aid the flow of discharge current 48. These current components will circulate in the tank circuit comprising winding 41 and capacitor 45. Since the current provided by winding 52 is alternating, generally at the rate of 5 kilohertz repetition rate, it will flow through such tank circuit to modulate the circulating transient current therein which is also referred to as the discharge current. The modulated transient or discharge current flowing through winding 41 will induce a voltage in secondary winding 42 retaining the modulation pattern of the voltage induced in winding 41, so as to activate the igniter coupled to the secondary winding 42 with modulation energy.

A summary of the logic provided by the timer and the logic circuit coupled thereto during the two modes of operation of the system, may be stated by means of a logic table, as follows:

| Mode of Operation | Timer's Protrusion 28 | Potential at Ramp of Q1 | State of Q1 | State of Q2 | State of Q3 | Gen. 50 | Windings 41 and 52 and Cap. 45 |
|---|---|---|---|---|---|---|---|
| First | not opposite any part of pole piece 25 | + | ON | OFF | ON | OFF | charged |
| Second | opposite | − | OFF | ON | OFF | ON | discharged |

-continued

| Mode of Operation | Timer's Protrusion 28 | Potential at Ramp of Q1 | State of Q1 | State of Q2 | State of Q3 | Gen. 50 | Windings 41 and 52 and Cap. 45 |
|---|---|---|---|---|---|---|---|
|  | part of pole piece 25 |  |  |  |  |  | and modulated by 50 |

Inasmuch as the circuit of FIG. 1 has been exhaustively tested, the following table provides approximate performance values under different conditions of operation. The values where measured are peak-to-peak levels as obtained by use of a high frequency oscilloscope, and the model using the distributor had shaft 12 driven by an electric motor at a speed comparable to an engine rotational speed of 3000 revolutions per minute. Primary winding 41 currents and voltages were measured and secondary winding 42 voltages and currents were computed.

| FIG. 1 System Performance Characteristics | | | | | |
|---|---|---|---|---|---|
| System Condition | Capacitors in System | Current in Amperes Through 41 | Voltage in Volts Across 41 | Current in Milliamperes Through 42 | Voltage in Volts Across 42 |
| (a) | None | 3.5 | 535 | 32 | 53,500 |
| (b) | 35 | 3.3 | 500 | 30 | 50,000 |
| (c) | 35 and 45 | 6.0 | 535 | 54 | 53,500 |
| (d) | 45 | 7.0 | 685 | 63 | 68,500 |
| (e) | 45 (modulation component provided by Gen. 50 only) | 2.5 | 270 | 23 | 27,000 |

The secondary voltage across winding 42 will be 100 times the amplitude of the primary voltage across winding 41 in view of ignition transformer 40 having a turns ratio of 100. The secondary current will be one-hundredth part of the primary current less the current loss due to the transfer efficiency of the transformer, taken at 90%.

Condition (a) of the performance table characterizes the basic system performance without the use of any capacitors in the system. Condition (d) represents the configuration providing the best system performance wherein capacitor 45 is connected in parallel with primary winding 41. Condition (e) represents the same condition as condition (d) except that the values stated are as shown from the oscilloscopic patterns, of that part of the modulation envelope of the primary circuit wherein the proportionate amount of either current or voltage was determined at a period during the second mode when the discharge current transient in the primary winding had decayed to zero and the energy wave seen on the oscilloscope screen represented the output from generator 50 only. This value will become important in later discussions relative sustaining a field and an electrical arc in an ionization chamber in which each igniter 70 or 80 is retained.

It should be noted that although generator 50 will provide a rectangular wave output, such rectangular wave output will occur only when winding 52 is connected to a resistive load. The reactive load to which winding 52 is actually connected will cause a distortion of the rectangular waveshape, so that in effect modulation of the discharge transient current will be by a rather complex waveform which is neither rectangular nor sinusoidal, but appearing more like a scalloped sinusoid.

Figure 6:
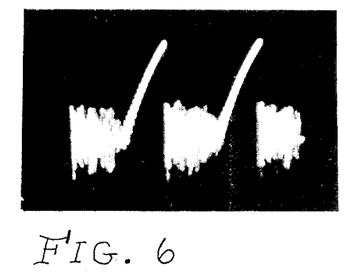
FIG. 6 is an oscilloscopic photograph of the ignition primary current developed by the system of FIG. 1.
Figure 7:
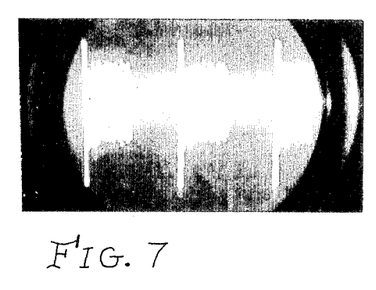
FIG. 7 is an oscilloscopic photograph of the ignition primary voltage developed by the system of FIG. 1.

Condition (d) for the current flowing through primary winding 41 is shown in the oscilloscopic photograph of FIG. 6, and the voltage waveform across winding 41 is shown in oscilloscopic photograph of FIG. 7.

Figure 1A:
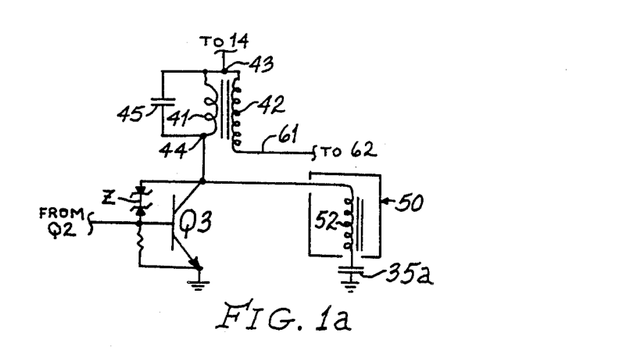
FIG. 1a is an alternate method of connecting the output components of the system of FIG. 1.

Referring to FIG. 1a, the system therein is virtually similar to but differs from that of the system of FIG. 1. In this system, winding 52 is connected to the collector of Q3 and a capacitor 35a is in series with winding 52. Since Q3 output is in parallel with winding 52, winding 52 is shunted by the impedance of Q3 during the second mode of operation when generator 50 is oscillating and Q3 is in its OFF state. Such impedance loads winding 52, and hence capacitor 35a is needed to preclude the output voltage of winding 52 from dropping to an unacceptably low value. The measurements made with respect to this circuit were not recorded, since the performance of this circuit was inferior to that of the circuit of FIG. 1 operating under condition (d), particularly in that the voltage across primary 41 was reduced. Therefore, further discussion utilizing an ignition system will presume that FIG. 1 circuit without capacitor 35 is being considered.

The foregoing circuits of FIGS. 1 and 1a utilized a magnetic pulse timer. It should be remembered that a conventional cam actuated contactor timer or an optical pulse generating timer can be used with a suitable logic circuit to trigger Q3 and turn generator 50 on and off during the first and second modes respectively, as effectively as performed by the magnetic pulse timer and its logic circuit used in conjunction with FIGS. 1 and 1a.

Referring to FIG. 2, a schematic representation is made of a piston 16 traveling in a cylinder 15 in a direction 17 during the compression phase or cycle of engine 10 to compress fuel in chamber 11 at the top of cylinder 15.

Such piston acts to compress the fuel injected into the cylinder by means of a suitable vaporizer, generally termed a carburetor or fuel injector, which vaporizes the fuel from its original liquid form prior to being received in chamber 11.

Such piston is shown at the 35 degree level prior to traveling to its zero degree level, or as commonly referred to the top dead center position of the piston whereat maximum fuel compression has taken place.

Figure 3:
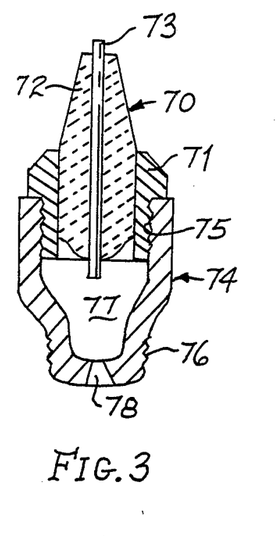
FIG. 3 is a cross section view of an igniter, partly in elevation, and a cross section view of an adapter into which the igniter is fitted, such adapter being used to provide an ionization chamber which is inserted in part into the main fuel receiving combustion chamber of an engine.
Figure 4:
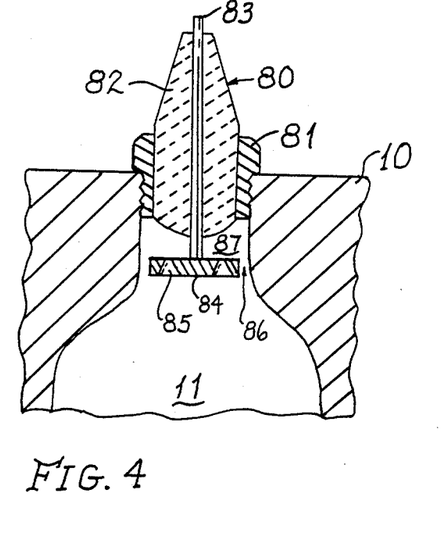
FIG. 4 is a cross section view of an igniter, partly in elevation, shown inserted in the main fuel receiving chamber of the engine wherein the electrodes and base of the igniter form a natural ionization chamber with the walls of the main chamber.

It is in the neighborhood of the 35 degree position during the compression stroke of piston 16 that fuel is initially ignited using the system of FIG. 1 in conjunction with igniters 70 or 80 as structurally illustrated in FIGS. 3 and 4 respectively.

Referring to FIG. 3, one of the igniters 70 as referred to in its schematic form in FIG. 1 and shown coupled to secondary winding 42 by connection to one of stationary members 63a, 63b, 63c or 63d of distributor 60, is illustrated in cross section seated in threads 75 of adapter 74. Igniter 70 comprises electrically conductive tubular base 71 retaining ceramic insulator 72 in which axial electrode 73 is fixed. One end of electrode 73 is connected to one of members 63a, 63b, 63c or 63d with the other of the members of the distributor having a like igniter and adapter arrangement. Adapter 74 is generally made of steel or other electrically conductive metal and has outer threads 76 for fitting same into a fuel combustion chamber of an engine. Adapter 74 forms a chamber 77 with igniter 70 and such chamber has an aperture 78 at its terminal end. When high voltage and high power electrical energy provided by transformer secondary 42 is applied to electrode 73 of igniter 70 by coupling same through distributor rotor 62 of FIG. 1, an electrical arc is created between the other end of electrode 73 within chamber 77 and the inner periphery of base 71 inasmuch as such inner periphery is generally closer in spacing to the electrode. However, the arc may form between electrode 73 and the inner surface of chamber 77 when such arc has extremely high energy content.

Electrode 73, base 71 and/or adapter 74 may be of magnetic material and permanently magnetized, so that in addition to the magnetic field created by the electrical arc, an additional magnetic field is always available to exert its force upon ionized and ignited fuel within chamber 77.

During the compression cycle of the engine, when as illustrated in FIG. 2, the piston moves upward in its cylinder toward chamber 11, ignition timing is initiated generally between 20 and 40 degrees before the piston reaches top dead center, depending on the particular engine involved, then the arc created within chamber 77 will ignite the fuel which had been transferred from combustion chamber 11 through aperture 78 into chamber 77 by virtue of the piston compressing the gas in chamber 11. Such fuel mixture within chamber 77 upon ignition will be expelled through aperture 78 in an ignited jet flame which will penetrate the fuel mass within chamber 11 to combust same and cause the piston to be moved rapidly through its power stroke.

Chamber 77 also acts as an ionization chamber of the fuel portion transferred therein. The fuel molecules in chamber 77 are excited by a bilpolar dual amplitude voltage as shown in the photgraph of FIG. 7 wherein the dual amplitude voltage is backed by the high current as shown in the photograph of FIG. 6, ionizing such fuel molecules by removing or stripping an electron from each molecule thus causing free electrons to migrate in one direction. The molecules deficient in electrons are positively charged ions moving in a direction opposite to the electron direction toward either electrode 73 or the inner surface of chamber 77 or the inner periphery of base 71 depending upon the polarity of the electrode, base or inner periphery at that time. The positively charged ion travels in a direction towards a structural member having a negative potential and the electron to a structural member having a positive potential. Since AC power modulates a transient electrical discharge contributed by the excitation means of the ignition system, there will be many reversals of polarity, in the order of 3 to 6 kilohertz per second, and consequently very heavy turbulence of ions and electrodes will result, particularly due to their tendency to reunite.

The excitation of the fuel in chamber 77 by the high voltage photographically illustrated in FIG. 7, occurs when by virtue of the modulated discharge current, a bipolar dual amplitude voltage waveform is generated. Such waveform consists of a first voltage of relatively short time duration and relatively high level as compared with the second voltage of the waveform having a relatively lower voltage level and a relatively longer time duration than the first voltage. Such first voltage initiates a temporal varying electric field and an electrical arc within chamber 77, and the second voltage sustains the electric field and arc within chamber 77 for the entire duration of the second mode of operation.

The electric field also causes acceleration of ionized fuel molecules within chamber 77 towards aperture 78, as well as accelerating the free electrons therein. The ignited fuel molecules accelerate through aperture 78 at ever increasing velocity into the fuel mass within the combustion chamber 11 at the head of the engine cylinder, to combust such fuel in an efficient manner. By the time the ignited fuel molecules pass as a jet flame through aperture 78 into the fuel mass in chamber 11, a large fuel nodule had been created that expands to the full diameter of the engine cylinder, and by the time the piston in such cylinder had traveled to its top dead center position at the end of the compression stroke, an optimum flame front had been established in chamber 11 to rapidly force the piston downward during its power stroke. The jet flame will be sustained by the second voltage portion of the modulated waveform for as long as there is fuel within chamber 77, assuring that all gas in chamber 11 will be converted to useful motive energy, except of course such part of the gas that is converted to heat.

Referring to FIG. 4, the principles involved and functions performed by the system as discussed in conjunction with FIG. 3, are the same except that the igniter structure is such that no adapter is needed.

Igniter 80, coupled in similar manner as igniter 70, to the system of FIG. 1, is shown in cross section seated in the conventional opening for igniters in combustion chamber 11 of engine 10. This igniter is of special construction, and like igniter 70, details thereof are available in U.S. Pat. Nos. 3,265,931 and 4,161,927, which show that these igniters are also magnetized.

Igniter 80 comprises electrically conductive base 81 threaded into combustion chamber 11. Base 81 retains ceramic insulator 82 which in turn retains electrode means consisting of axial electrode 83 held by insulator 82 and electrically conductive disk 84 orthogonal to electrode 83. Disk 84 has a plural number of tapered apertures 85 therein. Base 81, electrode 83 and/or disk 84 are of magnetic material and may be magnetized to exert an additional magnetic force upon ionized fuel molecules in a chamber 87 formed by base 81, the inner surface of chamber 11 and disk 84. Disk 84 is spaced from base 81 and from the inner surface of chamber 11, and the spacing between the inner surface of chamber 11 and disk 84 forms a passageway at 86 for enabling the injection of fuel into chamber 87 during the compression stroke of the piston and to enable ignited and ionized fuel molecules to be expelled therethrough as a series of jet flames into chamber 11 to ignite the fuel mass therein. Apertures 85 also act as a similar passageway for similar purposes. The functions performed due to the energy provided igniter 80 by the system of FIG. 1 are otherwise exactly as described in conjunction with the igniter and adapter of FIG. 3.

It should be noted that this ignition system does not require a distributor having a centrifugal advance mechanism to advance the timing with increase in engine speed nor does it require a vacuum advance mechanism to advance the timing due to change in engine load.

Figure 5:
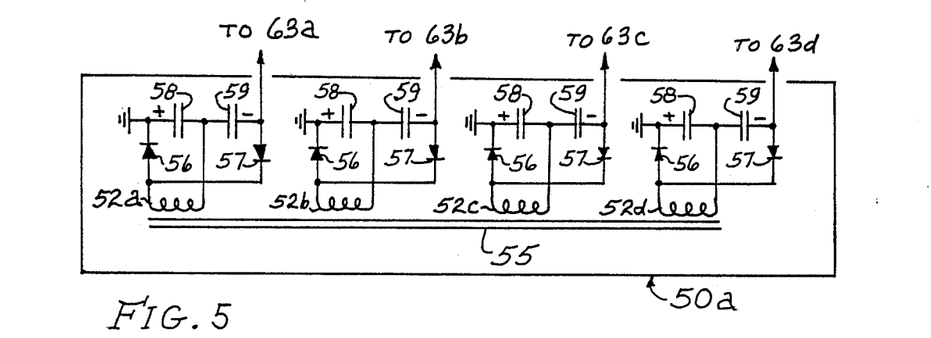
FIG. 5 in an electrical schematic of part of the modulation source of FIG. 1, showing a plurality of power sources that are usable to independently feed each igniter of the system so as to provide independently isolated electrical fields across each igniter base.

Referring to FIG. 5, modulation source 50a therein is identical to modulation source 50 of FIG. 1 except that source 50a has an additional set of windings 52a, 52b, 52c and 52d wound on core 55. Each of windings 52a through 52d has a diode 56 connected to one end of the winding in a forward-current conduction direction so that its anode is connected to one end of the winding, and the cathode of diode 57 is connected to the anode of diode 56. A pair of capacitors 58 and 59 are connected in series and the other end of the winding is connected to the junction of such capacitors. The cathode of diode 56 is connected to capacitor 58 which is the positive grounded terminal, and the anode of diode 57 is connected to capacitor 59 which is the upgrounded negative terminal. The circuit provides a voltage doubling at its output terminals and is shown in the textbook entitled Reference Data for Radio Engineers, 4th edition, page 305, published by International Telephone and Telegraph Corporation, New York, N.Y.

Four identical voltage doubling circuits are provided so as to enable a direct connection to be made of the negative terminal of each of these circuits to their respective igniter electrodes, inasmuch as each negative terminal is connected by an independent cable to each of stationary members 63a through 63d of distributor 60 in FIG. 1. Accordingly, an independent negative DC potential with respect to ground will exist at the igniters' electrodes during the second mode, when modulator 50a is activated. Such system, unlike the prior art, provides isolated power sources to provide fuel ionization potentials for the several igniters independently and thus avoid cross coupling of igniters and misfire as is possible in prior art systems.

It should be noted that this method of providing ionization fields is in addition to the fields provided for ionization by the system of FIG. 1 as already described above, and that this system or method is optional, though not actually necessary in view of the high energy dual amplitude voltage output discussed above. Additionally, if capacitors 58 and 59 and diodes 56 and 57 were removed, it would also be possible to supply independent AC ionization voltages to each igniter if such were desired.

Referring to FIGS. 6 through 9, the system of FIG. 1 was used to obtain the oscilloscopic photographs. Transformer 40 used, had a turns ratio of 100. Additionally, to obtain the oscilloscopic patterns, it was necessary to use a high power one-ohm resistor in series with winding 41 and a high ohmic voltage divider across primary 41 to obtain voltage division of one-hundredth fold. This was necessary since the 50 megahertz calibrated oscilloscope's internal attenuator was insufficient in its attenuation range to contain the modulation voltage within the face of the oscilloscope tube. The current was measured by measuring the voltage drop across the one-ohm resistor by connecting the oscilloscope's vertical channel leads thereto. The peak-to-peak current as shown in FIG. 6 and the peak-to-peak voltage as shown in FIG. 7, are as indicated in the table above entitled FIG. 1 System Performance Characteristics.

It should be again noted that the two conditions (d) and (e) are relevant to the discussion above in connection with FIG. 3 concerning the initiation or first voltage level included in condition (d), and the second or sustaining voltage level as defined by condition (e). It may therefore be seen from the table for condition (e) that a sustaining voltage of 27,000 volts fed an already existing arc and established by even a larger initiation voltage of 68,500 volts, as per condition (d), is more than sufficient to sustain the burning of gas residual in the ionization chamber, without the need of any other ionization potentials, such as discussed in conjunction with FIG. 5.

Figure 8:
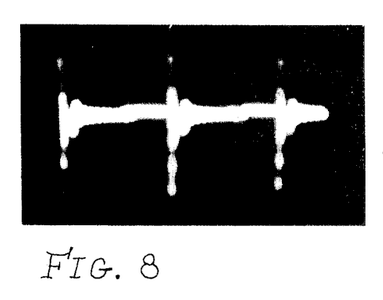
FIG. 8 is an oscilloscopic photograph of the ignition primary voltage developed by the system of FIG. 1 wherein the modulation voltage was removed.
Figure 9:
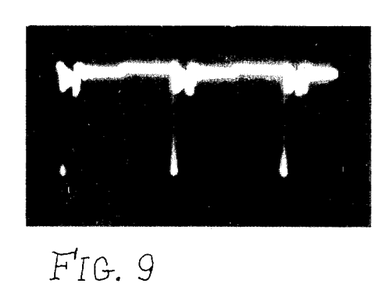
FIG. 9 is an oscilloscopic photograph of the ignition primary voltage developed by the system of FIG. 1 wherein the modulation voltage was removed and the modulation output terminal short circuited.

FIG. 8 shows the phenomena contributed by the presence of the inductance of winding 52 in series with primary winding 41. In obtaining this photograph, transistors Q were removed from modulator 50 so that the modulator only contributed its inductive output passively to the FIG. 1 system. The importance of this test is in the showing that the presence of a passive inductor in circuit will provide both a higher voltage output from the system as well as a bipolar output. The bipolarity aspect is reinforced when still with transistors Q removed from modulator 50, output winding 52 was short circuited and the voltage across primary winding 41 became unipolar at a lower voltage excursion than the voltage seen in the FIG. 8 photograph; such lower unipolar voltage photograph is shown in FIG. 9. It should be noted that all voltage measurements and photographs of FIGS. 7, 8 and 9 were made with the calibration settings and attenuator settings of the oscilloscope in identical positions.

Hence, the use of an inductive output from a modulator would appear to be far superior to the use of a generator or modulator having capacitive coupling such as a resistive-capacitive multivibrator.

At this point, it is appropriate to mention that vaporization and burning of fuel may even be effectively accomplished with a high energy modulated ignition system that not only provides a high power level but also provides a high energy level over the entire period alocated for ignition, namely the second mode of operation as above defined. Such high energy system is provided by the one shown in FIG. 1.

Utilizing such system, it may even be possible to combust the fuel without adding air from the atmosphere. Notably, atmospheric air contains about 80% nitrogen, and ignition systems using such air are known to produce undesirable oxides of nitrogen, particularly with air to fuel ratios of 15 to 18.

If the fuel, without atmospheric air, were vaporized and ignited by a high energy system such as FIG. 1 system, the oxygen content in the fuel coupled with the high energy of ignition would be sufficient to oxidize the fuel without producing oxides of nitrogen.

Hydrocarbon fuels commonly used, according to the Encyclopedia of Chemical Technology by Kirk and Othmer, Volume 10, 2nd editon 1966, pages 463-498, contain paraffins, olefins, naphthenes, aromatics and other additives. Examples of additives in addition to tetraethyl lead, are tolyl-phosphate (tri-cresyl phosphate) whose chemical formula is $(CH_3C_6H_4)_3PO_4$, chromium carbonyl whose chemical formula is $C_6CrO_6$, or ethyl alcohol, whose formula is $CH_3CH_2OH$. Aromatics such as arsenic compounds have formulae $ArAsO_3HNa$ or $ArAsO_3H_2$ also contain abundant oxygen. Notably all these additives contain oxygen, and other components in the fuel may also have oxygen content.

It has been determined in the laboratory, during operation of the system of FIG. 1, that ozone, detected by its characteristic smell, was generated due to the high energy arcs developed by the igniters. Consequently, atmospheric air being the media in which ozone was created, it would appear that the climate of creating ozone within a combustion chamber due to oxygen content of the fuel would be even more favorable. Ozone is a very powerful oxidizer, and within the engine would enable all fuel received in the engine's combustion chamber to be ozidized.

Referring to FIGS. 10 through 13, the use of water injection into vaporized fuel has been found to be effective to provide better performance. Many reasons are given, but the logical one would be that when a small amount of water is mixed with the fuel vapor and the vapor is subjected to an electric arc, that the water is broken down to its hydrogen and oxygen components. The hydrogen when added to the fuel only makes it burn better and the oxygen supports such combustion. In discussion of the FIGURES that follow, a practical water injection system is adaptable to presently used engine systems, and in conjunction with the high power, high energy ignition system of FIG. 1, will provide a very superior fuel burning process and superior engine performance.

Figures 10, 11:
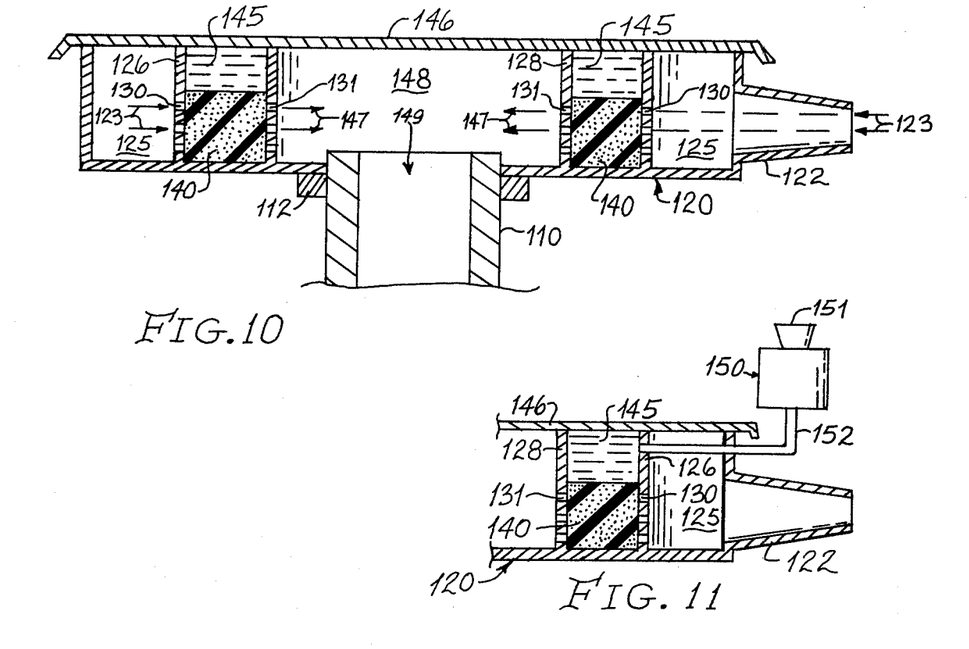
FIG. 10 is a cross section view of a humidifier unit coupled with a carburetor according to the invention.
FIG. 11 is a partial cross section view of the humidifier of FIG. 10 showing an external water feed to a water absorbing material within the humidifier.

Referring to FIG. 10, a cross section view of a circular air filter structure shows the throat or air horn 110 of a carburetor adapted to engine 10, which air horn may have a circumferential ring 112 for seating filter compartment 120 thereon. Compartment 120 has a tubular opening 122 in its side for admitting air at 123 which passes into a space 125 that is circumferential a pair of walls 126 and 128 forming a coaxial structure with each other. Walls 126 and 128 have apertures 130 and 131 respectively therein for permitting air to pass therethrough, generally at high velocity when the vehicle in which the engine is located is being driven.

A sponge, foam rubber or other water absorbing material 140 is either formed in a doughnut shape and fitted between walls 126 and 128, or may constitute an elongated member of such water absorbing material which is laid into the space between walls 126 and 128 so its ends abut each other. The space above the water absorbing material may be loaded with water 145. Prior to inserting material 140 between walls 126 and 128, it is soaked with water so that the water at 145 constitutes a reserve water supply to be absorbed by material 140 as the water from such material is used up or evaporated. Compartment 120 generally has a cover 146 which is secured thereto by means of a threaded bolt extending from the air horn, but is not shown in this drawing. Such cover 146 retains the water reserve 145 within compartment 20. As air 123 is forced through tubular opening 122 and into space 125, it passes through aperture 130, through water absorbing material 140 at which time it absorbs water moisture, and then passes through apertures 131 as humidified air into the center 148 of compartment 120. The humid air is injected through opening 149 of air horn 110 to mix with the gassified or vaporized fuel in the carburetor, thereby resulting in a water injected vaporized fuel mixture which is fed to the engine's cylinders to their respective combustion chambers in a well known manner.

FIG. 11, shows a portion of FIG. 10, adapted with an auxiliary water chamber 150 having an inlet 151 in which water may be added periodically and a pipe outlet 152 which is adapted to wall 126. The purpose of auxiliary chamber 150 is to act as a storage means for water which water is used only when water quantity 145 is exhaused, as the spongy material 140 will only absorb enough water until it is saturated. It is preferable to position chamber 150 at a little higher level than cover 146 so that water can be fed by gravitational action. Otherwise, a pump will be needed in series with pipe 152 to raise the water from chamber 150 if it is located below the level of cover 146. The remaining portions of compartment 120 in FIG. 11 is identical with those of FIG. 10.

Figure 12:
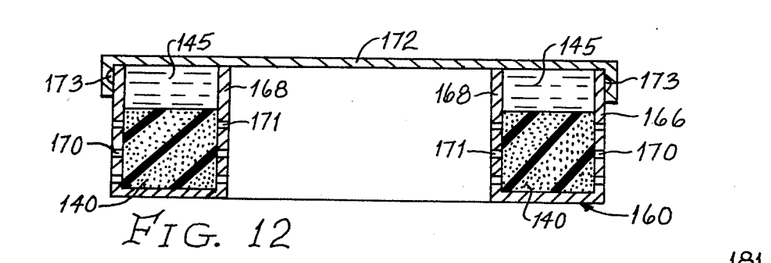
FIG. 12 is a cross section view of a humidifier element that can be utilized by inserting same in existing air cleaner chamber.

Referring to FIG. 12, it may be possible to utilize an air filter and water injector unit 160 in a conventinal air filter compartment adapted to an air horn structure. Such conventional air filter compartment is similar to compartment 120 shown in FIG. 10 but without walls 128 and 130 and without sponge material or water therein. Hence air filter and water injector unit 160 may be inserted in such conventional air filter compartment instead of the usual air filter normally inserted therein. Unit 160 has a pair of concentric walls 166 and 168 with apertures 170 and 171 respectively therein. Water absorbing material 140 is fitted between walls 166 and 168, and water quantity 145 is loaded as in the case of FIG. 10. Cover 172 is adapted to snap over a circumferential lip 173 to secure the cover to the unit. Unit 160 when adapted to a conventional air filter compartment, substitutes for the conventional air filter, and functions in the same manner as described for the assembly of FIG. 10.

Figure 13:
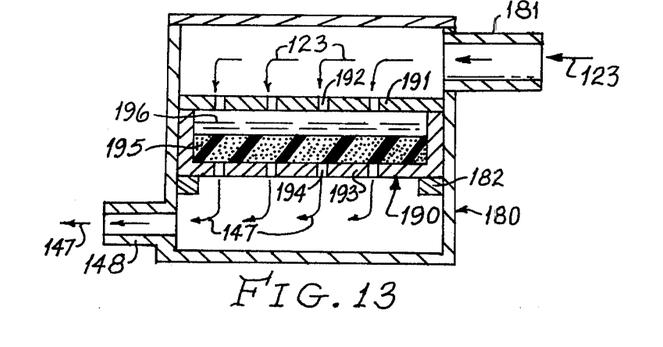
FIG. 13 is a cross section view of a humidifier unit adapted for use with a fuel injection system.

Referring to FIG. 13, the principles outlined in FIG. 10 air and water injector, are the same as for this configuration except that this configuration is tailored to function with engines that utilize fuel injection systems and hence are designed structurally somewhat differently. Compartment 180 is typical as used in an engine employing fuel injection. Compartment 180 has a circumferential inner lip for seating thereon the conventional air filter unit. However such air filter unit is substituted by air filter and water injector unit 190 seated on lip 182. Unit 190 performs the same function as unit 160 of FIG. 12. Unit 190 is generally rectangular in shape and has a top cover 191 with apertures 192 therein, and a bottom portion 193 with apertures 194 therein. A rectangularly shaped water absorbing material 195, such as sponge rubber, foam rubber or the like is saturated with water and is laid into the bottom of unit 190 covering apertures 194. A water quantity 196 is retained within unit 190 for replenishing the water in material 195. Air 123 is forced into compartment 180 in similar manner as in the case of FIG. 10, and passes through apertures 192, through water body 196 if present, through material 195 to emerge at 147 as humidified air which exits through nozzle 148 to feed the fuel injectors of the engine in a well known manner. Thus this structure supplies the water injection feature for a fuel injector type engine to obtain the advantages discussed above. It is of course obvious to utilize a water storage source 150 with this configuration by fitting pipe 152 either into the cover at top of compartment 180 or pipe 152 may be passed through air entry port 181 at 123 and inserted into one of apertures 192 and secured thereto.

The humidifying means, above described, may be used with a water reservoir below its level which feeds the humidifying means through a suitable pump. Such feed may be adapted as above described. The pump may be a lift or suction pump or a force pump activated by the vacuum of the engine. The pump may also be a rotary vacuum pump operating on centrifugal force principles or may be a diffusion type. If desired, water may be forced directly into the humidifying means by a pipe connected to a window washer reservoir which has its own pump means, or a pipe may be connected to the radiator of the automobile and water therefrom passed through a filter to the humidifying means.

It is also obvious, without the need of further graphical illustrations or detailed discussion, that the FIG. 13 structure or one similar to it could be adapted in engine systems employing carburetors with slight structure modifications, and the FIGS. 10 through 12 configurations or similar configurations performing similar functions can be adapted for use with engines employing fuel injection.

It should also be noted that a relatively flat water reservoir generally of a pliable plastic material, may be positioned on top of the unit containing the water absorbing material, as illustrated, to gravity feed drops of water into the water absorbing material.

I claim:

1. An ignition system having first and second modes of operation, said system being an integral part of an engine which develops motive power by burning fuel received in a main combustion chamber, comprising the combination of:
    an auxiliary combustion chamber, integral with the main combustion chamber, said chambers having a common passageway therebetween, said auxiliary chamber receiving a portion of the fuel;
    an electrical igniter, integral with said auxiliary chamber, said igniter having an electrically conductive base and an electrode electrically insulated from said base;
    an ignition transformer having a primary winding and a secondary winding coupled to said igniter; and
    excitation means, connected to said primary winding, for creating an electrical arc within the auxiliary chamber during the second mode and for creating a bipolar dual amplitude voltage waveform consisting of a first voltage of relatively short time duration and relatively high level as compared with the second voltage of said waveform of relatively lower voltage level and relatively longer time duration than the first voltage, said first voltage initiating an electric field and said arc within the auxiliary chamber and said second voltage sustaining said field and arc for the duration of the second mode, said second voltage also sustaining acceleration of a jet flame of the ignited fuel portion exiting through said passageway into the fuel within the main chamber.

2. The invention as stated in claim 1, wherein said excitation means produces said electric field within the auxiliary chamber and wherein said arc produces a magnetic field in said auxiliary chamber.

3. The invention as stated in claim 1, wherein said excitation means produces a temporal varying electric field within the auxiliary chamber.

4. The invention as stated in claim 1, wherein said igniter is magnetized thereby subjecting the fuel portion within the auxiliary chamber to magnetic flux.

5. The invention as stated in claim 1, including:
    vaporizing means, integral with said engine, for converting said fuel to its gaseous state prior to being received by the main combustion chamber; and
    humidifying means, coupled to the vaporizing means, for adding water saturated air to the fuel in its gaseous state.

6. The invention as stated in claim 5, wherein said humidifying means comprises:
    a humidifying chamber, coupled to the vaporizing means, having an air inlet; and
    water absorbing means, fitted within the humidifying chamber, for filtering said air and for enabling water moisture from within the water absorbing means to saturate the air passing through the water absorbing means, thereby providing filtered air with water content to the vaporizing means to mix with the fuel in its gaseous state.

7. The invention as stated in claim 6, wherein the water absorbing means also constitutes a filter for said air.

8. The invention as stated in claim 6, including a source of water within the humidifying chamber for supplying water to the water absorbing means.

9. The invention as stated in claim 6, including a source of water external to the humidifying chamber and coupled thereto for supplying water to the water absorbing means.

10. The invention as stated in claim 1, wherein said excitation means includes a modulator coupled to said primary winding and capacitor, and means as an integral part of said modulator for providing a part of the first voltage.

11. The invention as stated in claim 10, including auxiliary power means, as an integral part of the modulator, connected to said igniter, for enabling said igniter to establish an additional electric field within the auxiliary chamber so as to ionize the fuel portion therein.

12. The invention as stated in claim 10, including timing means, coupled to said primary winding and modulator, for enabling said primary winding to be charged during the first mode and for enabling discharge current flowing in the primary winding to be modulated during the second mode.

13. The invention as stated in claim 12, including driving means, coupling said engine to said timing means, for enabling said timing means to provide a substantially constant ignition timing angle for any rotational speed of and loading imposed on said engine.

14. The invention as stated in claim 12, wherein said timing means includes:
    a timer coupled to said engine; and
    a logic circuit connected to said timer.

15. An ignition system having first and second modes of operation, said system being an integral part of an engine which develops motive power by burning fuel received in a main combustion chamber, comprising the combination of:
    an auxiliary combustion chamber, integral with the main combustion chamber, said chambers having a common passageway therebetween, said auxiliary chamber receiving a portion of the fuel;
    an electrical igniter, integral with said auxiliary chamber, said igniter having an electrically conductive base and an electrode electrically insulated from said base;
    an ignition transformer having a primary winding and a secondary winding coupled to said igniter;
    a capacitor coupled to said primary winding; and
    excitation means, connected to said primary winding and capacitor, for creating an electrical arc within the auxiliary chamber during the second mode and for creating a bipolar dual amplitude voltage waveform consisting of a first voltage of relatively short time duration and relatively high level as compared with a second voltage of said waveform of relatively lower voltage level and relatively longer time duration than the first voltage, said first voltage initiating an electric field and said arc within the auxiliary chamber and said second voltage sustaining said field and arc for the duration of the second mode, said second voltage also sustaining acceleration of a jet flame of the ignited fuel portion exiting through said passageway into the fuel within the main chamber.

16. The invention as stated in claim 15, wherein said auxiliary chamber comprises a hollowed tubular adapter having first and second ends, said first end being adapted to retain said base, said second end having said common passageway and being adapted to the main chamber.

17. The invention as stated in claim 15, wherein said main combustion chamber has an inner surface, and wherein said electrode comprises an axial electrical conductor and an electrically conductive member orthogonal to and integral with said electrical conductor and spaced from said base and inner surface, said member, base and inner surface forming said auxiliary chamber and the spacing between said member and inner surface constituting said passageway.

18. The invention as stated in claim 15, wherein said excitation means produces a temporal varying field within the auxiliary chamber.

19. The invention as stated in claim 15, wherein said igniter is magnetized thereby subjecting the fuel portion within the auxiliary chamber to magnetic flux.

20. The invention as stated in claim 15, wherein said electric field is a DC field.

21. The invention as stated in claim 15, wherein said electric field is a temporal varying field.

22. The invention as stated in claim 15, including:
vaporizing means, coupled to said engine, for converting said fuel to its gaseous state prior to being received by the main combustion chamber; and
humidifying means, coupled to said engine, for adding water saturated air to the fuel in its gaseous state.

23. The invention as stated in claim 22, wherein said humidifying means comprises:
a humidifying chamber, coupled to the main combustion chamber, having an air inlet; and
water absorbing means, fitted within the humidifying chamber, for filtering said air and for enabling water moisture from within the water absorbing means to saturate the air passing through the water absorbing means, thereby providing filtered air with water content to the main combustion chamber to mix with the fuel in its gaseous state.

24. The invention as stated in claim 23, wherein the water absorbing means also constitutes a filter for said air.

25. The invention as stated in claim 23, including a source of water within the humidifying chamber for supplying water to the water absorbing means.

26. The invention as stated in claim 23, including a source of water external to the humidifying chamber and coupled thereto for supplying water to the water absorbing means.

27. The invention as stated in claim 15, wherein said excitation means includes a modulator coupled to said primary winding and capacitor, and means as an integral part of said modulator for providing a part of the first voltage.

28. The invention as stated in claim 27, including auxiliary power means, as an integral part of the modulator, connected to said igniter, for enabling said igniter to establish an additional electric field within the auxiliary chamber so as to ionize the fuel portion therein.

29. The invention as stated in claim 27, including logic means, coupled to said modulator and primary winding, for enabling said primary winding and capacitor to be charged during the first mode, and for enabling discharge current from the capacitor to flow in a direction so as to increase the current flowing through the primary winding and for enabling modulation of the primary winding current during the second mode.

30. The invention as stated in claim 29, including driving means, coupling said engine to said timing means, for enabling said timing means to provide a substantially constant ignition timing angle for any rotational speed of and loading imposed on said engine.

31. The invention as stated in claim 29, wherein said timing means includes:
a timer coupled to said engine; and
a logic circuit connected to said timer.

* * * * *